United States Patent [19]

Kennedy

[11] Patent Number: 5,148,661

[45] Date of Patent: Sep. 22, 1992

[54] TOBACCO HARVESTER AND USE THEREOF

[76] Inventor: Jerry L. Kennedy, Rte. 1 Box 23, Puryear, Tenn. 38251

[21] Appl. No.: 745,174

[22] Filed: Aug. 15, 1991

Related U.S. Application Data

[63] Continuation-in-part of Ser. No. 600,664, Oct. 22, 1990, Pat. No. 5,081,827.

[51] Int. Cl.⁵ .................. A01D 45/16; A01D 57/20
[52] U.S. Cl. ................................. 56/27.5; 56/14.8; 56/16.6; 414/26
[58] Field of Search ............... 56/27.5, 14.8, 16.4, 56/16.6, 17.2, 327.1; 414/26, 340

[56] References Cited

U.S. PATENT DOCUMENTS

| | | | |
|---|---|---|---|
| 3,798,884 | 3/1974 | Middleton | 56/27.5 |
| 4,335,570 | 6/1982 | Fitzmaurice | 56/327.1 |
| 4,379,669 | 4/1983 | Wilson | 56/27.5 X |
| 4,578,935 | 4/1986 | King | 56/27.5 |
| 4,965,993 | 10/1990 | Butler et al. | 56/327.1 |

*Primary Examiner*—Stephen J. Novosad
*Attorney, Agent, or Firm*—Abe Hatcher

[57] ABSTRACT

Aligning tobacco plants end to end in rows in a field with leaf ends trailing butt ends as the butt ends are picked up onto an elevating conveyor belt by turning it at the same speed as the ground or surface speed of a wheel of a trailer pulled by a tractor, the elevating conveyor being at one side of the trailer.

13 Claims, 2 Drawing Sheets

TOBACCO HARVESTER AND USE THEREOF

This is a continuation-in-part of Ser. No. 600,664, filed Oct. 22, 1990, now U.S. Pat. No. 5,081,827.

BACKGROUND OF THE INVENTION

1. Field of the Invention

This invention relates to tobacco harvesting. More particularly, it relates to method and apparatus for automatically picking up specially aligned cut tobacco plants and placing them in a position for manual spearing on tobacco sticks and loading on wagons, trailers or similar type carriers.

2. Description of the Prior Art

King U.S. Pat. No. 4,578,935 teaches manually placing tobacco plants lying transverse of or perpendicular to rows of a tobacco patch or field on an elevating conveyor and delivering them to spearers on a platform of a trailer being pulled by a tractor. This is a slow and tedious operation and will not work satisfactorily for plants lying otherwise.

SUMMARY OF THE INVENTION

After extended investigation I have found that by placing tobacco plants in such a tobacco patch or field end to end in parallel rows, that is, with leaf ends trailing butt ends of the stalks with respect to the direction opposite that in which the tractor is pulling the trailer along the rows, the plants may be picked up by an endless belt type conveyor angled upward and connected to the trailer, having a lower end with its belt barely touching the ground, if at all, but low enough for the belt or moving surface to pick up the plants at the butt ends of their stalks and deliver them at an opposite end of the conveyor at a height sufficient for workers on a trailer platform or foot support to spear them (as they come to them) on tobacco sticks held in upright holders on plates moving on a track in an oval manner as described in my copending application Ser. No. 600,664, filed Oct. 22, 1990, now U.S. Pat. No. 5,081,827.

According to a preferred embodiment of the invention the endless belt-type conveyor is run at substantially the same speed as the ground feet speed of a wheel of the trailer by connecting the two by mechanical gear-sprocket, gear-chain-cogwheel, gear-roller axle or shaft or like speed-coordinating means. According to another embodiment an electronic-hydraulic pump regulator system is employed to turn the endless belt at substantially the same surface feet speed as the trailer wheel.

The endless belt elevating conveyor preferably has as a coordinated part thereof an extension or length or section continuing same at an upper end but running substantially parallel to the ground in a horizontal manner. It may be stationary or of the same or a similar endless movable or turnable belt-type structure and should be high enough off the ground and above a frame of the trailer or a bed of the trailer to enable the spearers to reach the plants easily as they fall on it or come past the worker or workers at that station. As the plants are speared on moving sticks in stickholders as aforementioned they are then removed on the sticks from the stickholders and loaded in stacks, tiers or the like, preferably on a framework, on a carrier such as another trailer or a tobacco wagon or the like pulled at the rear of the trailer on which the spearers work.

BRIEF DESCRIPTION OF THE DRAWING

For a better understanding of my invention reference will now be made to the drawing which forms a part hereof.

In the drawing.

DESCRIPTION OF THE DRAWING AND OF A PREFERRED EMBODIMENT

Figure 1:
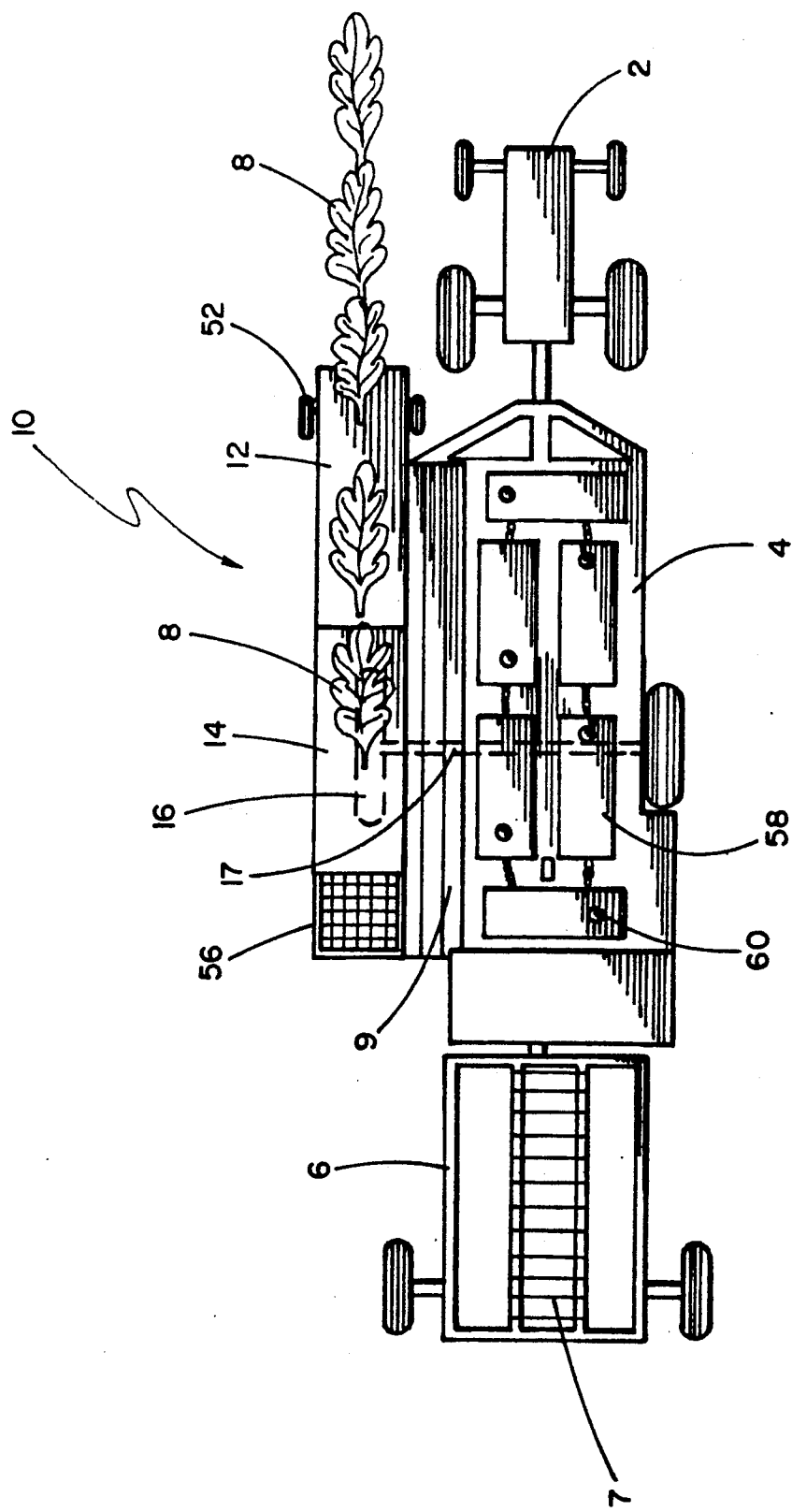
FIG. 1 is a view from above or a top view of a tobacco harvesting process and apparatus according to the invention from tractor and pickup conveyor to a trailer vehicle on which tobacco speared on sticks is hung or tiered on tiers, a framework or the like, or simply laid in neat stacks.

In the drawing as shown generally in FIG. 1, tractor 2 pulls spearing platform trailer or trailer frame 4 having axle 17 between wheels 16, a tobacco plant pickup endless or continuous belt conveyor assembly 10 and a carrier such as another trailer or a wagon 6 on which sticks with tobacco plants 8 speared thereon are loaded, for example, hung on speared tobacco stick-holding framework 7. Conveyor assembly 10 includes a continuous or endless belt conveyor 12 having wheels 52 at a lower tractor end thereof which picks up tobacco plants 8 aligned lengthwise of the conveyor at the butt ends thereof and, after elevating them, delivers them in order as picked up to a horizontal extension portion 14 of said conveyor 12 whic may be another endless belt-like conveyor or a non-turning or stationary base onto which the tobacco plants are moved at a height from which they can be picked up by spearers standing on a platform 9 without stooper over or bending over. Spearers on platform 9 impale or spear the tobacco plants via their stalks on sticks placed upright in stick-holders 60 on plates 58 turning around an oval track as described in aforesaid copending Ser. No. 600,664, now U.S. Pat. No. 5,081,827, from which the sticks with tobacco plants impaled or speared thereon are manually removed and placed on framework 7 on the aforesaid carrier 6. Trash left after spearing the plants on the sticks falls into a basket or bin 56 in the embodiment of the invention wherein the conveyor extension is an endless belt-like one.

Figure 2:
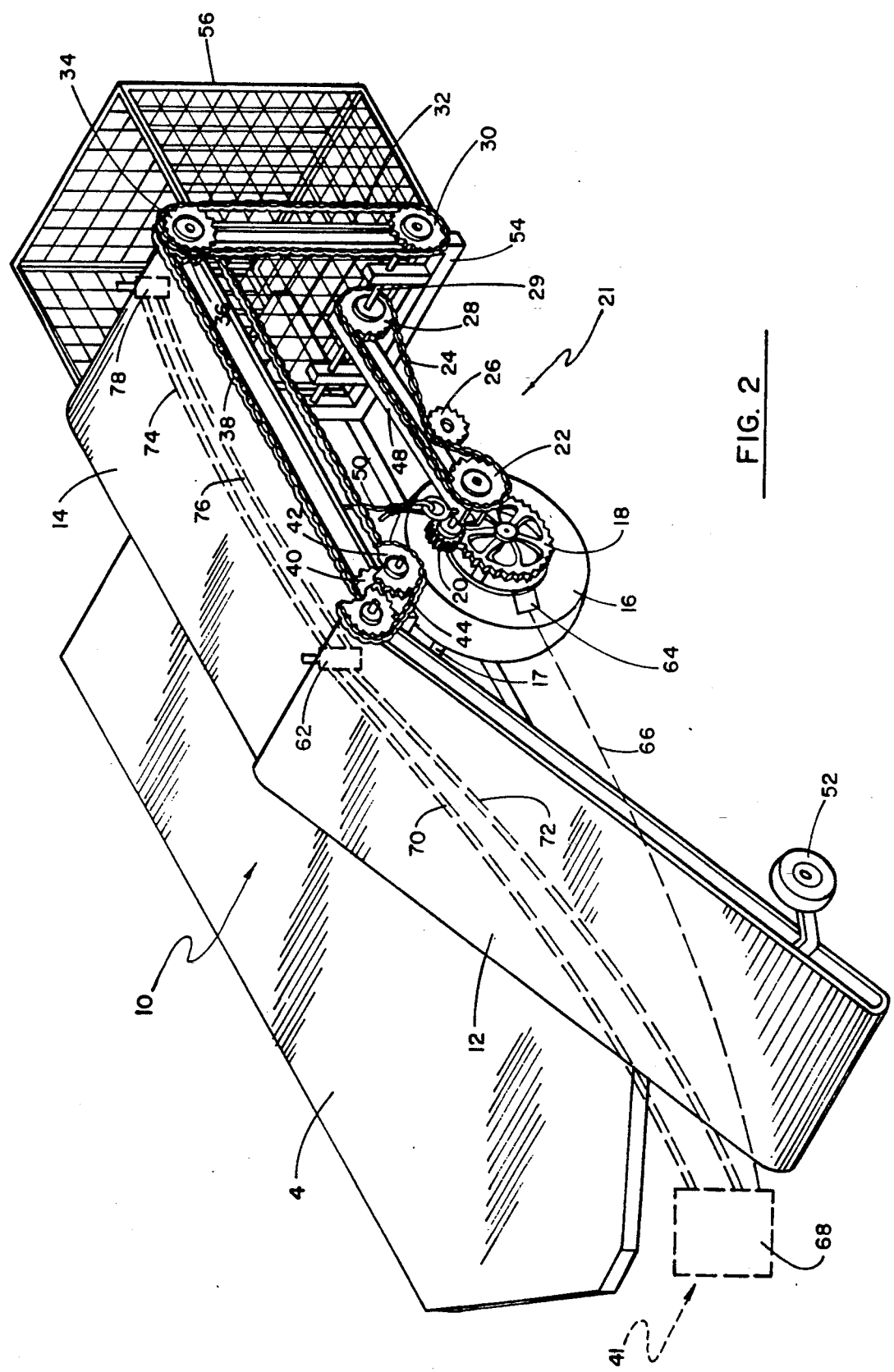
FIG. 2 is a perspective view, schematic in part, from one side showing a pickup and delivery conveyor according to the invention, including a gear-sprocket mechanism and, with dotted lines, an alternative electronic-hydraulic system. for running the conveyor belt or track at the surface fee speed of a trailer wheel.

In FIG. 2 gear-sprocket mechanism 21 of a preferred embodiment for making tobacco plant endless belt-type conveyor 12 (shown here with horizontal extension 14) turn at the same speed as the ground or surface feet of trailer wheel 16 is made up in order, generally, beginning at wheel 16 on axle 17, of larger gear 18 and smaller gear 20, sprocket 22, with chain 24 travelling, mostly horizontally, around sprocket 22, and, via sprocket 26, around sprocket 28 on shaft 29 on supporting structure 54, with chain 32 going around sprocket 30 and sprocket 34 positioned thereabove at the rear end of conveyor, and finally chain 38 running around sprockets 36 and 40 and alongside endless belt conveyor extension 14 to sprockets 42 and 46, with chain 44 going therearound, all to automatically turn pickup endless belt-like conveyor 12 (including extension 14) at the ground or surface feet speed of wheel 16 of trailer 4.

An alternative way to accomplish this same result is to employ an electronic-hydraulic system exemplified by the one shown schematically with dotted lines in FIG. 2, wherein electronic speed adjuster 64 at wheel 16 is connected via line 66 to an hydraulic pump and regulator valve 68, from which lines 70 and 72 lead to and from a first hydraulic motor 62, from which lines 74 and 76 lead to and from a second hydraulic motor 78.

Below conveyor extension 14 is located shaft 48. Cable 50 is for disengaging the gear-sprocket mechanism 21 at the end of a row and before moving to another field, for example.

While the invention has been described in terms of preferred embodiments, the claims appended hereto are intended to encompass all embodiments of the invention.

Having thus described my invention and certain preferred embodiments thereof, I claim:

1. A process for harvesting tobacco which comprises placing cut tobacco plants lengthwise along parallel rows of a tobacco field with leaf ends of stalks trailing butt ends and butt ends pointed toward a starting end of each row, turning an endless belt of an upwardly angled conveyor having a lower end running on a wheel and being sufficiently low on the ground for said butt ends to be lifted from ground level onto said turning endless belt at substantially the same speed as the surface speed of a wheel of a trailer being pulled by a tractor and having said conveyor associated with said trailer toward one side thereof, thereby pickin up said tobacco plants at their butt ends onto said endless belt as it turns upward at said lower end of said conveyor while said tractor and trailer move along said rows, conducting said plants along said endless belt to an opposite end of said conveyor and removing them from said endless belt conveyor for further handling.

2. The process of claim 1 wherein said tobacco plants are conducted by said conveyor onto an elevated extension of said endless belt substantially parallel to said ground and then manually removed from said extension.

3. The process of claim 1 wherein said tobacco plants are conducted by said conveyor onto a supported extension comprising a second endless belt substantially parallel to said ground.

4. The process of claim 1 wherein said tobacco plants are conducted by said conveyor onto an elevated extension comprising a stationary base substantially parallel to said ground and then manually removed from said extension.

5. The process of claim 1 wherein said removing comprises manually spearing said tobacco plants on sticks and then loading them on frames of a tobacco carrier being pulled by said tractor behind said trailer.

6. The process of claim 1 wherein said removing comprises manually spearing said tobacco plants on sticks in ovally moving upright stickholders.

7. Apparatus for harvesting tobacco comprising in operating position an endless belt conveyor angled upwardly having an upper end and a lower end and a wheel of adjustable height toward its lower end, said lower end being sufficiently adjustable to a ground operational level to permit said lower end when turning to dip under and pick up butt ends of tobacco plants aligned end to end in rows with leaf ends trailing butt ends as said conveyor approaches them, a trailer for spearing operations next to said endless belt conveyor and conveyor belt speed control means for coordinating turning speed of said conveyor belt with surface speed of a wheel of said trailer when said trailer along with said endless belt conveyor is being pulled by a tractor.

8. The apparatus of claim 7 wherein said conveyor belt speed control means comprise a gear-sprocket mechanism.

9. The apparatus of claim 7 wherein said conveyor belt speed control means comprise an electronic-hydraulic system.

10. The apparatus of claim 7 wherein said endless belt conveyor comprises an elevating section and at said upper end an elevated moving belt extension substantially parallel to ground level.

11. The apparatus of claim 7 wherein said endless belt conveyor comprises an elevating section and at said upper end and elevated stationary base substantially parallel to ground level.

12. The apparatus of claim 7 wherein said trailer has a platform adapted for spearers to stand on when receiving tobacco plants from said conveyor and an ovally movable track having upright spaced-apart stickholders thereon adapted for said spearers to spear said tobacco plants on sticks placed therein when said track is moving by them.

13. The apparatus of claim 12 wherein a tobacco carrier is positioned behind said trailer for loading on framework thereof sticks with tobacco stalks speared thereon as removed from said stickholders.

* * * * *